(No Model.) 2 Sheets—Sheet 1.
R. JONES.
SAW SWAGING MACHINE.

No. 592,293. Patented Oct. 26, 1897.

Attest:
Jas. E. Thomas
Lester T. Fenton

Inventor:
Richard Jones
By Geo. P. Thomas
His Atty.

(No Model.) 2 Sheets—Sheet 2.

R. JONES.
SAW SWAGING MACHINE.

No. 592,293. Patented Oct. 26, 1897.

Attest:
Jas. E. Thomas.
Chester T. Fenton.

Inventor:
Richard Jones
By Geo. P. Thomas,
His Atty.

UNITED STATES PATENT OFFICE.

RICHARD JONES, OF BAY CITY, MICHIGAN.

SAW-SWAGING MACHINE.

SPECIFICATION forming part of Letters Patent No. 592,293, dated October 26, 1897.

Application filed March 26, 1897. Serial No. 629,399. (No model.)

*To all whom it may concern:*

Be it known that I, RICHARD JONES, a citizen of the United States, residing at Bay City, in the county of Bay and State of Michigan, have invented certain new and useful Improvements in Saw-Swaging Machines, of which the following is a specification, reference being had to the accompanying drawings, and to the figures of reference marked thereon, which form a part of this specification.

This invention relates to improvements in machines for automatically swaging the teeth of saws; and it consists in the combination, arrangement, and construction of the various parts and elements used in its construction, as I shall hereinafter fully describe in detail, and which will also be specifically pointed out in the claims of this specification.

One of the objects of the invention is to provide a machine to which an ordinary saw-swage may be attached, and which will operate said saw-swage automatically for swaging the teeth of saws with a uniformity and accuracy that is unobtainable in operating the swage by hand.

Another object of the invention is to provide a machine to which an ordinary hand-swage may be attached, and which may be adjusted to swage the teeth of saws of different dimensions, and which will adjust itself upon uneven teeth with the same precision that it does upon even teeth, whereby each tooth is made uniform in size and shape and provided with the desired lateral spread.

Another object of the invention is to provide a machine for automatically operating saw-swages that is simple and cheap in its construction and at the same time accurate, strong, durable, and effective in its operation.

I attain these objects by means of the devices and contrivances illustrated in the accompanying drawings, in which the same figures of reference indicate like parts throughout the several views, and in which—

Figure 1:
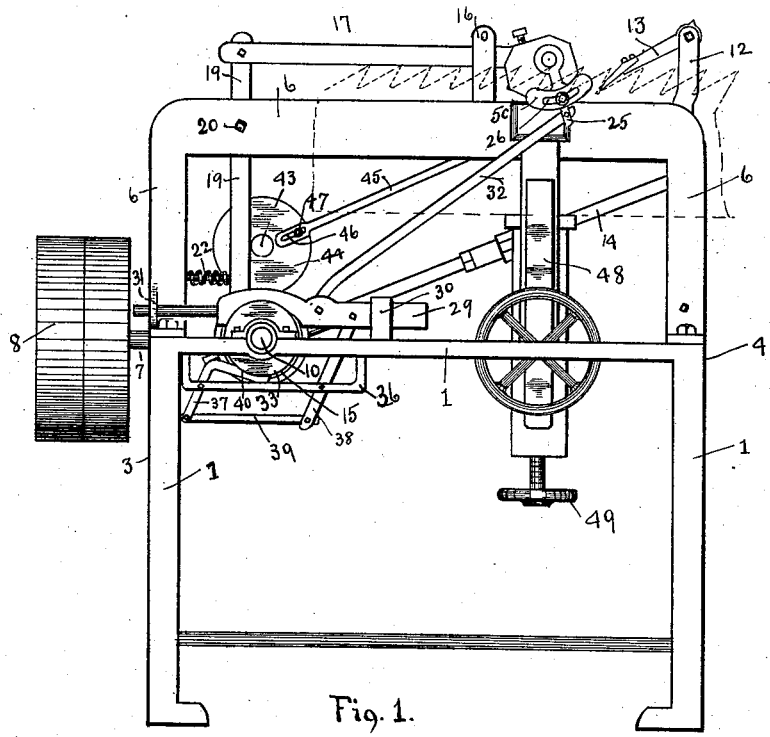
Figure 6:
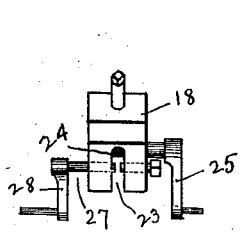
Figure 3:
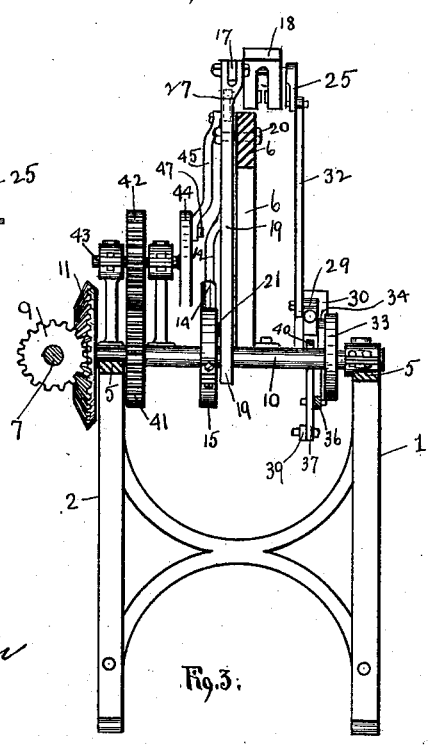
Figure 8:
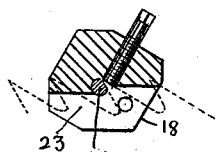
Figure 7:
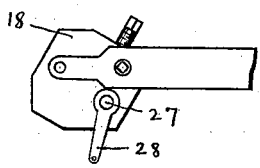
Figures 2, 4, 5:
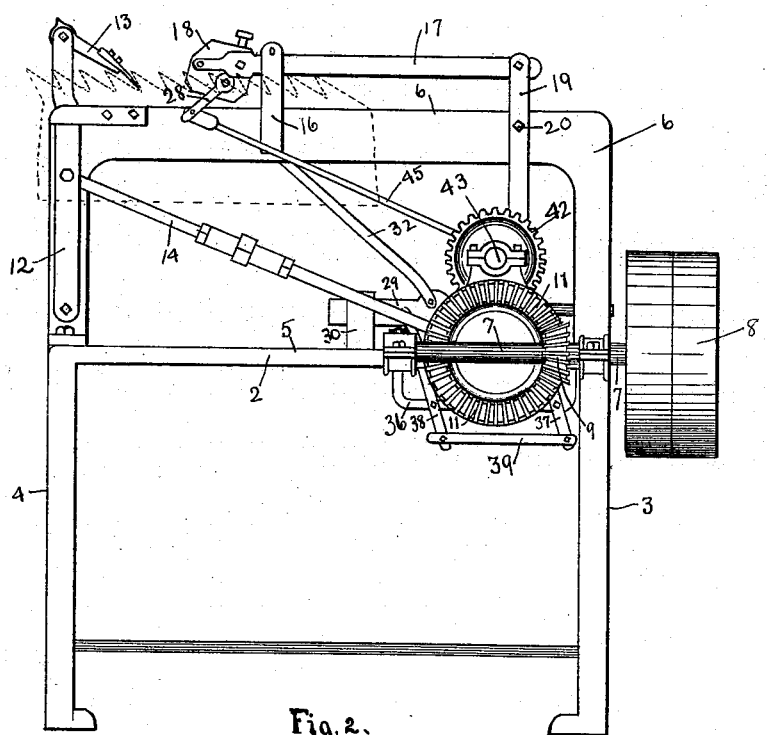

Figure 1 is a front side elevation of my improved machine, and arranged for operating an ordinary hand-swage. Fig. 2 is a rear elevation of the same. Fig. 3 is an end view of the same, partly sectional. Fig. 4 is a detail view of the cam for operating the swage movement. Fig. 5 is a detail view of the swaging-die-operating mechanism. Figs. 6, 7, and 8 represent rear, side, and vertical sectional views of the swage detached.

1 represents the front side of the frame of the machine, 2 is the rear side, 3 is the left end, 4 is the right end, and 5 is the top, while 6 is an arched supporting portion extending longitudinally over and bolted at each end to the top 5 of the frame.

7 is a shaft journaled upon the rear side of the frame, and upon this shaft is mounted a fast-and-loose-pulley device 8, to which power is applied from any convenient source for rotating the shaft, and 9 is a beveled pinion mounted upon the shaft 7.

10 is a shaft mounted in suitable boxes located upon the top 5 and extending transversely over the frame. The shaft is provided on its rear end with a large beveled gear-wheel 11, which intermeshes with the pinion 9, for imparting the desired revolution to the shaft 10.

12 is an upwardly-extending arm pivoted at its lower end to the rear side of the supporting-portion 6, near the end 4, and a pawl 13 is pivotally secured to the upper end of this arm for engaging with the gullet of the saw-tooth.

14 is a connecting-rod with one end pivotally secured to the arm 12 and with its opposite end connected to an eccentric 15, which is mounted upon the shaft 10.

Bolted to the top of the frame 6 is a guide-piece 16, provided with a slot in which rests a horizontal bar 17, carrying on its forward end a swage-block 18, and with its opposite or rear end pivotally secured to a vertical lever 19, which is pivoted to the supporting-frame 6 by the bolt 20, while its lower end, reaching downwardly, is held into engagement with a lug 21 on the eccentric 15, by means of a spring 22. (Shown in Fig. 4.)

Illustrated in Figs. 6, 7, and 8 is a form of saw-swage which it is preferable to use, but it is the intention of this invention to provide a machine which will operate any ordinary hand-swage which has an oscillating swaging-die and oscillating devices for clamping the saw, and, as shown in the drawings, this form of swage consists of the swage-block 18, provided with a longitudinal slot 23 for receiving the saw-tooth, and 24 is a swaging-die passed transversely into the swage-block and extending across the slot 23, and having the portion which is exposed within the slot provided with a die-face, and mounted to turn or oscillate in its bearings by means of a lever 25, which may be adjusted in a slot 26, contained in a short auxiliary lever 50, to bring the die-face to the desired position in relation to the saw-tooth, while the swage-block is held firmly in position by means of a clamping-screw 27, which is impinged upon the side of the saw-tooth by means of an operating-lever 28.

To the top 5 of the frame, at the front side, is provided a sliding portion 29, mounted in the guides 30 and 31, while 32 is a connecting-rod with its lower end pivotally secured to this sliding portion 29 and with its opposite end pivoted to the lever 25 for operating the swaging-die 24.

Upon the forward end of the shaft 10 is mounted a disk 33, provided with a lug 34, which, as the disk is revolved, engages with a shoulder 35 on the under side of the sliding portion 29 and moves the said portion toward the left end 3 of the machine.

Secured to the under side of the top 5 of the frame and beneath the disk 33 is a horizontal frame portion 36, having the vertical levers 37 and 38 pivotally connected to its side by their central portions, the levers being located a short distance from and parallel with each other, and with their lower ends pivoted to the ends of a connecting-bar 39 to form a uniform oscillating movement of the levers, and the upper end of the lever 38 is pivotally secured to the sliding portion 29, while the upper end of the lever 37 is provided with a portion 40 bent at a right angle to the lever and arranged for engaging with the lug 34 on the disk 33, so that as the disk revolves the lug comes in contact with the side of the portion 40 and oscillates the lever 37 on its pivot, which, by means of the connecting-bar 39, causes a corresponding oscillation of the lever 38 to occur, and forces the sliding portion 29 backwardly toward the right end 4 of the machine.

Mounted on the shaft 10, near the rear side of the frame, is a gear-wheel 41 for engaging with a gear-wheel 42, mounted on a counter-shaft 43, situated directly over the said gear-wheel 41, and upon the forward end of the shaft 43 is mounted a disk 44.

45 is a connecting-rod with one end pivotally secured to the lever 28, which operates the clamping device 27, and the opposite end of this rod is provided with a longitudinal slot 46, through which a bolt 47 is passed and tapped into the disk 44 near its periphery.

48 is a clamping device secured to the front of the frame for supporting the saw in position, and is provided with an adjusting-wheel 49 for placing the supporting device in the desired position for supporting the saw, so that the teeth thereof will be arranged for engagement with the swaging devices.

Having described the general construction of the different parts of my invention, I will now proceed to explain the operation of the same.

The saw being adjusted in the supporting device 48, power is applied to the pulleys 8 on the shaft 7, and the shaft 10 is revolved by means of the gear-wheels 9 and 11, which rotates the eccentric 15 and actuates the arm 12 and the pawl 13 thereon, and the outer end of the pawl resting in the gullet of the tooth of the saw then moves the saw to the distance of one tooth and brings the tooth to be swaged in position for engagement with the swaging-die, and at this point the lug 21, which acts as a cam, comes in contact with the side of the vertical lever 19, which, being oscillated thereby, moves the swage-block in the opposite direction to that traveled by the saw, and as the eccentric 15 revolves a sufficient distance to release the pawl 13 from engagement with the gullet of the tooth the lug or cam 21 leaves the vertical lever 19, and the spring 22 then causes the said lever to swing backwardly and draw the swage-block 18 on the tooth which rests in the slot and places the swaging-die in its proper position upon the point of the tooth, which operation, together with the action of the spring, it will be readily seen, will overcome any uneven distance between the points of the teeth of the saw, and will also allow the swaging-die to be firmly seated upon any tooth that may be short and of a different contour from the rest. While the parts are in this position the rotation of the disk 44 brings the bolt 47 into engagement with the outer end of the slot 46 and actuates the connecting-rod 45 and the lever 28 for tightening the clamp 27 (which is provided with a left-hand thread) firmly against the blade of the saw, and at the same time that the bolt 47 engages with the end of the slot 46 the lug 34 on the face of the disk 33 engages with the shoulder 35 of the sliding portion 29 and moves said portion toward the end 3 of the frame, which, by means of the connecting-rod 32, oscillates the swaging-die 24 and impinges the die-face upon the tooth of the saw and swages or spreads the point of the tooth to the desired lateral dimension, and as the lug 34 and the disk 33 disengages with or leaves the shoulder 35 (the disk having traveled one-quarter of a revolution) the bolt 47 leaves the end of the slot 46 and releases the clamp 27 instantly, and the lug 34 on the disk 33 then coming in contact with the end 40 of the lever 37 forces the same downwardly and oscillates the levers 37 and 38, and this action throws the sliding portion 29 back and returns the swaging-die to its original position, and the parts are again in position to actuate the saw forward to operate upon another tooth. It will be readily seen that as the clamp 27 and the swaging-die 24 are immediately released after their operation ample time is given the eccentric 15 and the lug or cam 21 to actuate the saw and swage to place them in position for swaging the following tooth. It will be noticed that by the action of the lever 19 and the lug 21 the swage-block is moved in a direction opposite the movement of the saw when fed forward by the finger, and that the swaging-die, after having passed over the front of the tooth upon which it is to operate, is again moved backward and into position to place the die-face upon the tooth by means of the spring 22, which holds the die in contact with the tooth until the clamping mechanism has had time to operate to retain the saw firmly in position while the die is operated for the swaging operation; and the spring being elastic in its movement of the swage allows the location of the swage to be varied according to any variation of distance apart or in length of the teeth upon which it operates, and this is especially important, as all saws are provided with teeth having a slight variation, and when the adjustment of the swage-block is positive the short teeth pass without being properly swaged, while the longer teeth are spread beyond the desired limit. It will be also understood that as connecting-rods, cams, and eccentrics are used principally in the mechanism of this invention the action of the same is positive and accurate, and this is a great advantage, as the movement of the clamp 27 and the swaging-die 24 is so short that great accuracy is required; and while I have described and illustrated a swage having a certain general construction it is not entirely essential that any particular form or design of swage be employed, as any of the principal forms of hand-swages which are provided with rotating clamping devices and an oscillating swaging-die operate substantially the same as regards the construction of the operating-levers and the location of the several parts.

As there are many well-known and common contrivances which may be substituted for use in place of many parts of the operating mechanism herein described, therefore I wish to state that I do not confine my invention to the precise form and arrangement of the several devices shown and described for moving the several parts of the swage devices; but

What I claim as my improvement, and desire to secure by Letters Patent, is—

1. In a saw-swaging machine, the combination of the frame carrying a feed-finger mechanism and devices for supporting the saw, a swage-block adjustably mounted on said frame and carrying an oscillating swaging-die and devices for clamping the saw-tooth, with devices, as a cam for moving said swage-block forwardly, and a spring for moving said swage-block rearwardly for placing the swaging-die upon the tooth, substantially as set forth.

2. The combination in a saw-swaging machine carrying devices for holding the saw and a feed-finger for moving the saw rearwardly, a swage-block provided with an oscillating swaging-die and with saw-clamping devices, with a support for carrying the said swage-block and capable of a to-and-fro movement lengthwise of the saw, a cam for actuating said support forwardly for moving the swage-block over the saw-tooth, and a spring for actuating the support rearwardly for placing the swaging-die upon the tooth, substantially as set forth.

3. The combination in a saw-swaging machine of the frame provided with devices for supporting the saw, a feed-finger for moving the saw rearwardly, a support mounted for sliding on said frame and carrying a swage-block having an oscillating swaging-die and a clamp for holding the saw-tooth, a cam for sliding said support to pass the swage-block forwardly over the saw-tooth, and a spring for sliding said support rearwardly for placing said swaging-die upon the saw-tooth, substantially as set forth.

4. In a saw-swaging machine the combination of the frame-carrying devices for supporting the saw and a finger-feed mechanism for moving the saw rearwardly, with a horizontal bar mounted for sliding on said frame and carrying on its forward end a swage-block having an oscillating swaging-die and clamping devices for holding the saw-tooth, a cam for actuating said bar forwardly to move said swage-block over the tooth, and a spring for moving said bar rearwardly for placing said swaging-die upon the saw-tooth, substantially as set forth.

5. In a saw-swaging machine, the combination with the frame provided with supports for carrying the saw and devices for feeding the saw, with a horizontal bar mounted on guides secured to said frame, and carrying on one end a block having an oscillating swaging-die, and provided with devices for clamping the saw-tooth, a vertical lever pivoted by one end to the opposite end of said bar and with its opposite end pivoted to said frame, a cam for operating said lever to move the bar in one direction, and a spring for operating said lever to move said bar in the opposite direction, and means for operating the clamping devices and for oscillating the swaging-die, substantially as set forth.

6. In a saw-swaging machine the combination of the frame provided with supports for carrying the saw, and with devices for feeding the saw, a block having an oscillating swaging-die and devices for oscillating said die, a clamping-bolt 27, having on its outer end an operating-lever 28, with a connecting-rod 45, having one end pivoted to the end of said lever 28, and with its opposite end provided with a slot 46, a counter-shaft mounted upon said frame and carrying a disk 44, and a bolt 47, passed through said slot 46, and tapped into the disk, and means for imparting revolution to the counter-shaft, substantially as set forth.

7. In a saw-swaging machine, the combination of the frame provided with devices for supporting and for feeding the saw, a horizontal bar supported on guides on said machine-frame and carrying on its forward end a block provided with rotating devices for clamping the saw-tooth and with a swaging-die having on its outer end a lever for oscillating said die, the portion 29, mounted on said frame for moving endwise and provided with a shoulder 35, a shaft mounted upon said frame and carrying a disk 33, provided with a lug 34, for engaging with said shoulder 35, and a connecting-rod 32, having one end pivoted to said portion 29, and with its opposite end pivoted to said swaging-die lever, substantially as set forth.

In witness whereof I hereunto affix my signature in the presence of two witnesses.

RICHARD JONES.

Witnesses:
C. M. TRUMP,
GEO. P. THOMAS.